United States Patent
Dubay et al.

(10) Patent No.: US 9,828,019 B2
(45) Date of Patent: Nov. 28, 2017

(54) STEERING COLUMN ASSEMBLY

(71) Applicant: Steering Solutions IP Holding Corporation, Saginaw, MI (US)

(72) Inventors: Robert W. Dubay, Saginaw, MI (US); Matthew T. Vincent, Saginaw, MI (US); Randy W. Jones, North Branch, MI (US); Michael P. Anspaugh, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/065,231

(22) Filed: Mar. 9, 2016

(65) Prior Publication Data
US 2017/0259842 A1 Sep. 14, 2017

(51) Int. Cl.
*B62D 1/19* (2006.01)

(52) U.S. Cl.
CPC .................. *B62D 1/195* (2013.01)

(58) Field of Classification Search
CPC .................. B62D 1/195; B62D 1/19
See application file for complete search history.

(56) References Cited

U.S. PATENT DOCUMENTS

| | | | | |
|---|---|---|---|---|
| 6,655,716 B2 * | 12/2003 | Riefe | ...... | F16F 7/123 188/374 |
| 7,455,320 B2 * | 11/2008 | Imamura | ...... | B62D 1/195 280/777 |
| 9,056,628 B2 * | 6/2015 | Russell | ...... | B62D 1/195 |
| 9,540,034 B2 * | 1/2017 | Takahashi | ...... | B62D 1/195 |
| 2016/0159387 A1 * | 6/2016 | Okano | ...... | B62D 1/184 74/493 |
| 2016/0244015 A1 * | 8/2016 | Dubay | ...... | B60R 21/02 |

* cited by examiner

*Primary Examiner* — Faye M Fleming
(74) *Attorney, Agent, or Firm* — Cantor Colburn LLP

(57) ABSTRACT

A steering column assembly includes a first energy absorption strap and an energy absorption strap mounting assembly coupled to a jacket assembly. The energy absorption strap mounting assembly includes an engagement surface and at least one standoff. The at least one standoff extends from at least one of the first energy absorption strap and the engagement surface. The at least one standoff spaces the first energy absorption strap from the engagement surface in an assembled condition. The spacing defines a receiving area configured to receive a second energy absorption strap therein.

19 Claims, 2 Drawing Sheets

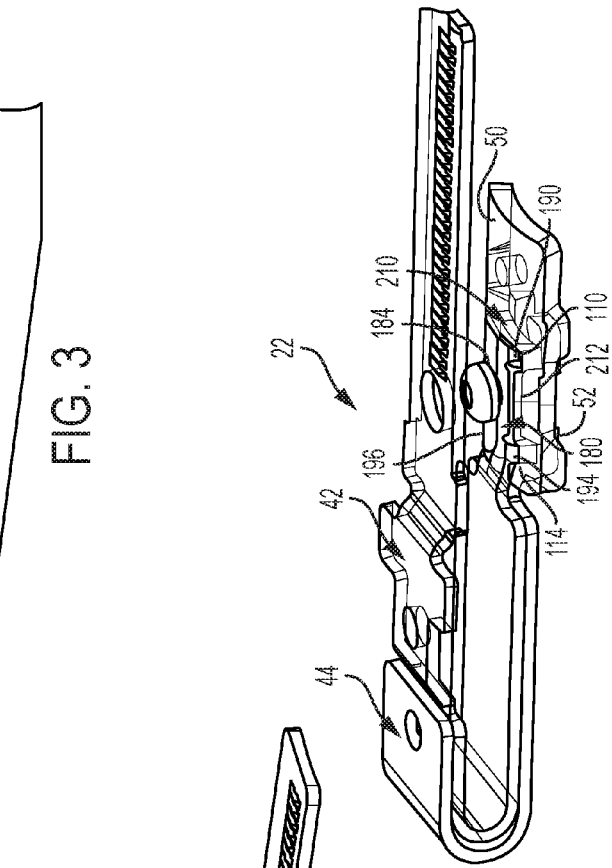
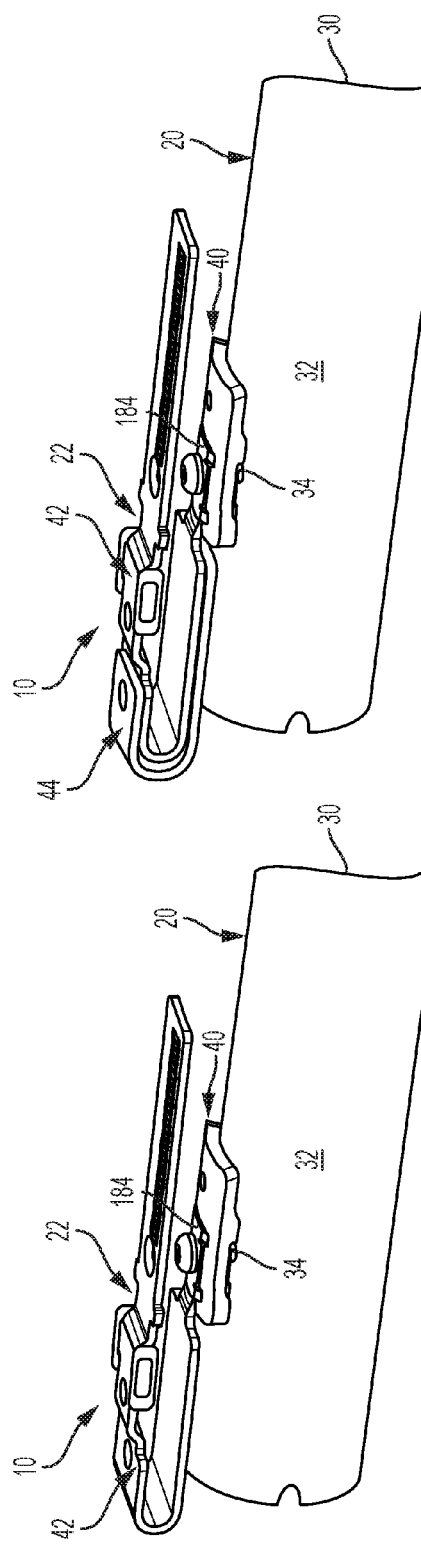
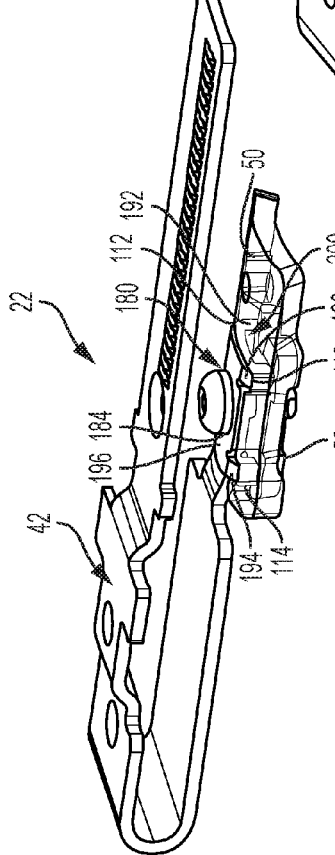

STEERING COLUMN ASSEMBLY

BACKGROUND OF THE INVENTION

The present invention relates to a steering column assembly having an energy absorption strap mounting assembly.

Steering column assemblies are sometimes equipped with a collapsing mechanism. The collapsing mechanism enables components of the steering column assembly to collapse along a longitudinal axis during a steering column collapse event. The collapsing of the steering column assembly absorbs energy during the steering column collapse event. Commonly, steering column assemblies incorporate various energy absorption straps to vary a collapse load to initiate the steering column collapse event. The various energy absorption straps may require different mounting schemes to attach the energy absorption straps to the steering column assembly.

SUMMARY OF THE INVENTION

According to an embodiment of the present invention, a steering column assembly is provided. The steering column assembly includes a jacket assembly and an energy absorption assembly. The energy absorption assembly is coupled to the jacket assembly and includes a first mounting member and a second mounting member. The first mounting member has a first mounting member portion, a first arm, and a second arm. The first arm extends from the first mounting member portion towards a first end of the first mounting member. The second arm is spaced apart from the first arm and extends from the first mounting member portion towards the first end of the first mounting member. The second mounting member has a first surface and a second surface disposed opposite the first surface. The first surface engages an underside of the first mounting member. The first surface, the first arm, the second arm, and the first mounting member portion define an energy absorption strap mounting region.

According to another embodiment of the present invention, a steering column assembly is provided. The steering column assembly includes a first energy absorption strap and an energy absorption strap mounting assembly coupled to a jacket assembly. The energy absorption strap mounting assembly includes an engagement surface and at least one standoff. The at least one standoff extends from at least one of the first energy absorption strap and the engagement surface. The at least one standoff spaces the first energy absorption strap from the engagement surface in an assembled condition. The spacing defines a receiving area configured to receive a second energy absorption strap therein.

According to yet another embodiment of the present invention, an energy absorption assembly provided with a steering column assembly is provided. The energy absorption assembly includes a first mounting member and a second mounting member. The first mounting member has a first mounting member portion, a first arm that extends from the first mounting member portion towards a first arm and, and a second arm spaced apart from the first arm that extends from the first mounting member portion towards a second arm and. The first arm, the second arm, and the first mounting member portion defines an opening. The second mounting member has a second mounting member portion that includes a first surface and a second surface disposed opposite the first surface. The first surface engages a first arm underside, a second arm underside, and a first mounting member portion underside.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a translating portion of a steering column assembly having an energy absorption assembly with a first energy absorption strap;

FIG. 2 is a perspective view of the energy absorption assembly with the first energy absorption strap;

FIG. 3 is a perspective view of a translating portion of a steering column assembly having an energy absorption assembly with a first energy absorption strap and a second energy absorption strap;

FIG. 4 is a perspective view of the energy absorption assembly with the first energy absorption strap and the second energy absorption strap;

DETAILED DESCRIPTION

Figure 5:
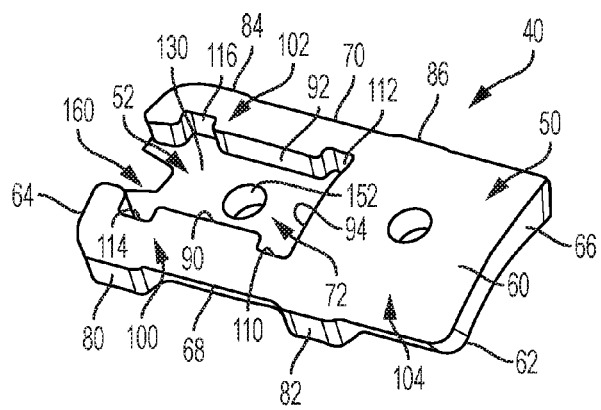
FIG. 5 is an outer perspective view of a first mounting member coupled to a second mounting member of the energy absorption assembly.

Referring now to the Figures, where the invention will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

Referring to FIGS. 1-4, perspective views of a translating portion or translating subassembly of a steering column assembly 10 is shown. The steering column assembly 10 extends along a steering column axis. The steering column assembly 10 is a telescope adjustable steering column assembly that is configured to be movable along the steering column axis or pivotable relative to a rake or pivot axis disposed transverse to the steering column axis. In at least one embodiment, the steering column assembly 10 is a non-adjustable steering column assembly that is not movable along the steering column axis or is not pivotable relative to a rake of pivot axis. The steering column assembly 10 includes a jacket assembly 20 and an energy absorption assembly 22.

Should the steering column assembly 10 be configured as a telescope adjustable steering column assembly, the jacket assembly 20 is configured as the translating portion of the steering column assembly 10. The jacket assembly 20 and the energy absorption assembly 22 move together fore and aft along the steering column axis through a range of adjustment.

The jacket assembly 20 is connected to a vehicle structure. The jacket assembly 20 is adjustable through telescope or rake movement relative to the vehicle structure. The jacket assembly 20 is collapsible such that during a steering column collapse event the jacket assembly 20 collapses towards the vehicle structure. The jacket assembly 20 has a body 30. The body 30 has an exterior surface 32. The exterior surface 32 defines an opening 34. At least a portion of the energy absorption assembly 22 is disposed on the exterior surface 32. In at least one embodiment, the opening 34 receives at least a portion of the energy absorption assembly 22.

The energy absorption assembly 22 is configured to provide a drag load or force opposing collapsing of the jacket assembly 20 relative to the vehicle structure during a steering column collapse event. The drag load or force opposing collapsing of the jacket assembly 20 helps reduce various risks to an operator of the vehicle during the steering column collapse event.

The energy absorption assembly 22 includes an energy absorption strap mounting assembly 40, a first energy absorption strap 42, and in some embodiments, a second energy absorption strap 44. The energy absorption strap mounting assembly 40 provides an attachment feature or interface feature for the first energy absorption strap 42 and the second energy absorption strap 44 and the jacket assembly 20. The energy absorption strap mounting assembly 40 is configured to permit the use of the first energy absorption strap 42 without employing the second energy absorption strap 44 and is configured to permit the use of the first energy absorption strap 42 in conjunction with the second energy absorption strap 44 while using a common energy absorption strap mounting assembly configuration and without adjustment of the first energy absorption strap 42 during installation of the second energy absorption strap 44.

During an energy absorption event, such as a steering column collapse event the jacket assembly 20 moves towards the vehicle structure. At least one of the first energy absorption strap 42 and the second energy absorption strap 44 are held affixed to a stationary steering column structure, such as a lower jacket assembly, that is removed for clarity. In at least one embodiment, the first energy absorption strap 42 includes a plurality of ridges or serrations that engage the stationary steering column structure. During an adjustment of the jacket assembly 20 relative to the stationary steering column structure or the vehicle structure, the first energy absorption strap 42 and/or the second energy absorption strap 44 are released from and do not engage the stationary steering column structure.

Figure 6:
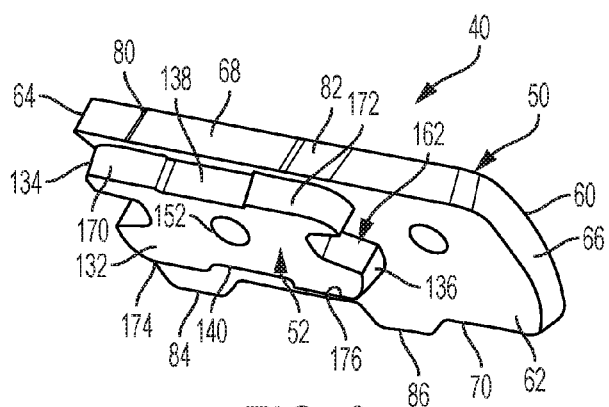
FIG. 6 is an inner perspective view of the first mounting member coupled to the second mounting member of the energy absorption assembly.
Figure 7:
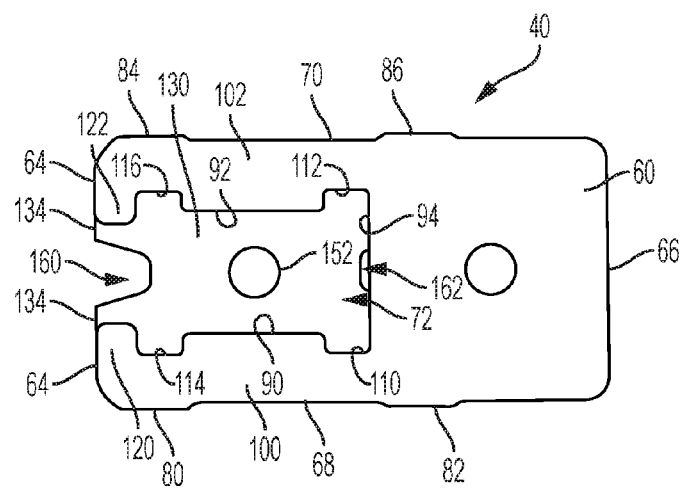
FIG. 7 is a plan view of the first mounting member coupled to the second mounting member of the energy absorption assembly.

Referring to FIGS. 5-7, the energy absorption strap mounting assembly 40 includes a first mounting member 50 and a second mounting member 52. The first mounting member 50 includes a first surface 60, a second surface 62, a first end surface 64, a second end surface 66, a first side surface 68, a second side surface 70, and an opening 72.

The first surface 60 forms an exterior surface of the first mounting member 50. The first surface 60 is spaced apart from and does not engage the exterior surface 32 of the body 30 of the jacket assembly 20.

The second surface 62 is disposed opposite the first surface 60. The second surface 62 forms an underside of the first mounting member 50. The second surface 62 is configured to engage the exterior surface 32 of the body 30 of the jacket assembly 20.

The first end surface 64 extends from the first surface 60 to the second surface 62. The first end surface 64 extends from the first side surface 68 to the second side surface 70 with a break therealong that is part of the opening 72. The first end surface 64 is disposed proximate a first end of the first mounting member 50.

The second end surface 66 is disposed opposite the first end surface 64. The second end surface 66 extends from the first surface 60 to the second surface 62. The second end surface 66 extends from the first side surface 68 to the second side surface 70. The second end surface 66 is disposed proximate a second end of the first mounting member 50 disposed opposite the first end of the first mounting member 50.

The first side surface 68 extends from the first surface 60 to the second surface 62. The first side surface 68 extends from the first end surface 64 to the second end surface 66. The first side surface 68 defines a first engagement pad 80 and a second engagement pad 82.

The first engagement pad 80 is disposed proximate the first end surface 64. The first engagement pad 80 extends away from the first side surface 68 in a first direction. The second engagement pad 82 is spaced apart from the first engagement pad 80. The second engagement pad 82 is disposed proximate the second end surface 66. The second engagement pad 82 extends away from the first side surface 68 in the first direction.

The second side surface 70 extends from the first surface 60 to the second surface 62. The second side surface 70 extends from the first end surface 64 to the second end surface 66. The second side surface 70 defines a third engagement pad 84 and a fourth engagement pad 86.

The third engagement pad 84 is disposed proximate the first end surface 64. The third engagement pad 84 extends away from the second side surface 70 in a second direction disposed opposite the first direction. The fourth engagement pad 86 is spaced apart from the third engagement pad 84. The fourth engagement pad 86 is disposed proximate the second end surface 66. The fourth engagement pad 86 extends away from the second side surface 70 in the second direction.

The opening 72 of the first mounting member 50 is defined by a first inner surface 90, a second inner surface 92, and a third inner surface 94. The first inner surface 90 is disposed substantially parallel to the first side surface 68. The first inner surface 90, the first side surface 68, and the first end surface 64 define a first arm 100. The second inner surface 92 is disposed substantially parallel to the second side surface 70. The second inner surface 92, the second side surface 70, and the first end surface 64 define a second arm 102. The second arm 102 is spaced apart from the first arm 100.

The first arm 100 extends from a first mounting member portion 104 disposed proximate the second end of the first mounting member 50. The first arm 100 extends from the first mounting member portion 104 towards the first end of the first mounting member 50. The second arm 102 extends from the first mounting member portion 104 towards the first end of the first mounting member 50. In at least one embodiment, the opening 72 is defined by the first arm 100, the second arm 102, and the first mounting member portion 104.

The first arm 100 and the second arm 102 define a first notch 110, a second notch 112, a third notch 114, and a fourth notch 116. The first notch 110 is disposed proximate the first mounting member portion 104. The first notch 110 extends from the first inner surface 90 towards the first side surface 68. The first notch 110 is spaced apart from the third notch 114. The third notch 114 is disposed proximate the first end surface 64. The third notch 114 is disposed proximate the first end of the first mounting member portion 104. The third notch 114 extends from the first inner surface 90 towards the first side surface 68.

The second notch 112 is disposed proximate the first mounting member portion 104. The second notch 112 extends from the second inner surface 92 towards the second side surface 70. The second notch 112 is spaced apart from the fourth notch 116. The fourth notch 116 is disposed proximate the first end surface 64. The fourth notch 116 is disposed proximate the first end of the first mounting member portion 104. The fourth notch 116 extends from the second inner surface 92 towards the second side surface 70.

The first arm 100 includes a first feature 120. The first feature 120 is disposed proximate a first end of the first arm 100. The first feature 120 is disposed proximate the first end of the first mounting member 50. The first feature 120 extends towards the second arm 102. The first feature 120 extends from the first inner surface 90 towards the second inner surface 92.

The second arm 102 includes a second feature 122. The second feature 122 is disposed proximate a first end of the second arm 102. The second feature 122 is disposed proximate the first end of the first mounting member 50. The second feature 122 extends towards the first arm 100. The second feature 122 extends from the second inner surface 92 towards the first inner surface 90.

The second mounting member 52 includes a first surface 130, a second surface 132, a first end surface 134, a second end surface 136, a first side surface 138, and a second side surface 140. In at least one embodiment, the second mounting member 52 is integrated into or is defined by the jacket assembly 20. The first surface 130 is spaced apart from and does not engage the exterior surface 32 of the body 30 of the jacket assembly 20. The first surface 130 is configured as an engagement surface that engages an underside of the first mounting member 50, i.e. the second surface 62 of the first mounting member 50. The second mounting member 52 is joined to the first mounting member 50 proximate the engagement between the first surface 130 of the second mounting member 32 and the second surface 62 of the first mounting member 50. In at least one embodiment, the first and second mounting members 50, 52 are integrally formed as a unitary component. In at least one embodiment, the first and second mounting members 50, 52 are operatively coupled to each other in any suitable manner.

The first surface 130 of the second mounting member 52 engages an underside of the first arm 100, an underside of the second arm 102, and an underside of the first mounting member portion 104. The first surface 130 of the second mounting member 52, the first arm 100, the second arm 102, and the first mounting member portion 104 define an energy absorption strap mounting region.

The second surface 132 is disposed opposite the first surface 130. The second surface 132 forms an underside of the second mounting member 52. The second mounting member 52 defines a fastener hole 152 that extends from the first surface 130 to the second surface 132.

The first end surface 134 extends from the first surface 130 to the second surface 132. The first end surface 134 extends from the first side surface 138 to the second side surface 140. The first end surface 134 is disposed proximate a first end of the second mounting member 52. The first end surface 134 of the second mounting member 52 is disposed proximate the first end surface 64 of the first mounting member 50.

The second end surface 136 is disposed opposite the first end surface 134. The second end surface 136 extends from the first surface 130 to the second surface 132. The second end surface 136 extends from the first side surface 138 to the second side surface 140. The second end surface 136 is disposed proximate a second end of the second mounting member 52 and is disposed opposite the first end of the second mounting member 52. The second end surface 136 of the second mounting member 52 is disposed proximate the third inner surface 94 of the first mounting member 50.

The second mounting member 52 defines a first recess 160. The first recess 160 extends from the first end surface 134 towards the second end surface 136. The first recess 160 extends from the first end surface 134 towards the fastener hole 152.

The second mounting member 52 defines a second recess 162. The second recess 162 extends from the second end surface 136 towards the first end surface 134. The second recess 162 extends from the second end surface 136 towards the fastener hole 152.

The first side surface 138 extends from the first surface 130 to the second surface 132. The first side surface 138 extends from the first end surface 134 to the second end surface 136. The first side surface 138 of the second mounting member 52 is disposed proximate the first side surface 68 of the first mounting member 50. The first side surface 138 defines a first engagement pad 170 and a second engagement pad 172.

The first engagement pad 170 is disposed proximate the first end surface 134. The first engagement pad 170 extends away from the first side surface 138 in a first direction. The first engagement pad 170 of the second mounting member 52 is disposed proximate the first engagement pad 80 of the first mounting member 50.

The second engagement pad 172 is spaced apart from the first engagement pad 170. The second engagement pad 172 is disposed proximate the second end surface 136. The second engagement pad 172 extends away from the first side surface 138 in the first direction. The second engagement pad 172 of the second mounting member 52 is disposed proximate the second engagement pad 82 of the first mounting member 50.

The second side surface 140 is disposed opposite the first side surface 138. The second side surface 140 extends from the first surface 130 to the second surface 132. The second side surface 140 extends from the first end surface 134 to the second end surface 136. The second side surface 140 of the second mounting member 52 is disposed proximate the second side surface 70 of the first mounting member 50. The second side surface 140 defines a third engagement pad 174 and a fourth engagement pad 176.

The third engagement pad 174 is disposed proximate the first end surface 134. The third engagement pad 174 extends away from the second side surface 140 in a second direction disposed opposite the first direction. The third engagement pad 174 of the second mounting member 52 is disposed proximate the third engagement pad 84 of the first mounting member 50.

The fourth engagement pad 176 is spaced apart from the third engagement pad 174. The fourth engagement pad 176 is disposed proximate the second end surface 136. The fourth engagement pad 176 extends away from the second side surface 140 in the second direction. The fourth engagement pad 176 of the second mounting member 52 is disposed proximate the fourth engagement pad 86 of the first mounting member 50.

Referring back to FIGS. 1-4, the first energy absorption strap 42 is connected to the jacket assembly 20 through the energy absorption strap mounting assembly 40. The first energy absorption strap 42 includes an end portion 180 that is received within the energy absorption strap mounting region. The end portion 180 includes a plurality of standoff features and a strap fastener hole 184. In at least one embodiment, the plurality of standoff features are provided with the second mounting member 52 and extend from the first surface 130.

The plurality of standoff features extend away from the end portion 180. The plurality of standoff features may be configured as tabs, fingers, spacers, etc. In at least one embodiment, the plurality of standoff features are provided with the first mounting member 50 or the second mounting member 52. A first standoff feature 190 of the plurality of standoff features is configured to be received within the first notch 110. The first standoff feature 190 engages the first surface 130 of the second mounting member 52 when the first standoff feature 190 is received within the first notch 110.

A second standoff feature 192 of the plurality of standoff features is configured to be received within the second notch 112. The second standoff feature 192 engages the first surface 130 of the second mounting member 52 when the second standoff feature 192 is received within the second notch 112.

A third standoff feature 194 of the plurality of standoff features is configured to be received within the third notch 114. The third standoff feature 194 engages the first surface 130 of the second mounting member 52 when the third standoff feature 194 is received within the third notch 114.

A fourth standoff feature 196 of the plurality of standoff features is configured to be received within the fourth notch 116. The fourth standoff feature 196 engages the first surface 130 of the second mounting member 52 when the fourth standoff feature 196 is received within the fourth notch 116.

The end portion 180 is spaced apart from the first surface 130 of the second mounting member 52 by the plurality of standoff features. Should only the first energy absorption strap 42 be employed to meet design steering column collapse requirements, the end portion 180 is coupled to a second mounting member 52 of the energy absorption strap mounting assembly 40 by a fastener that extends through the strap fastener hole 184 and the fastener hole 152.

The end portion 180, the plurality of standoff features and the first surface 130 of the second mounting member 52 define a receiving area 200 that receives at least a portion of the second energy absorption strap 44 such that the second energy absorption strap 44 is nested with the first energy absorption strap 42. Both of the first energy absorption strap 42 and the second energy absorption strap 44 may be employed to meet design steering column collapse requirements. The plurality of standoff features spaces the first energy absorption strap 42 such that it is spaced apart from the first surface 130 to permit strap interchangeability.

The second energy absorption strap 44 at least partially surrounds the first energy absorption strap 42. The second energy absorption strap 44 includes a second energy absorption strap end portion 210 and a second energy absorption strap fastener hole 212 that is aligned with fastener holes 152, 184.

The second energy absorption strap end portion 210 is at least partially received within the receiving area 200. The second energy absorption strap end portion 210 is disposed proximate the end portion 180 of the first energy absorption strap 42. The second energy absorption strap end portion 210 is disposed between the end portion 180 of the first energy absorption strap 42 and the first surface 130 of the second mounting member 52. In at least one embodiment, the second energy absorption strap end portion 210 engages the end portion 180 of the first energy absorption strap 42 and the first surface 130 of the second mounting member 52. The second energy absorption strap end portion 210 is coupled to the second mounting member 52 and the end portion 180 of the first energy absorption strap 42 by a fastener that extends through the strap fastener hole 184, the second energy absorption strap fastener hole 212, and the fastener hole 152.

The energy absorption strap mounting assembly 40 is configured to accommodate an energy absorption assembly that utilizes a single energy absorption strap or multiple energy absorption straps using a single energy absorption strap mounting assembly configuration. The plurality of standoff features of the single energy absorption strap spaces the single energy absorption strap from the first surface 130 to allow the addition of additional energy absorption straps without changing position of the single energy absorption strap relative to a surface of the energy absorption strap mounting assembly 40. The energy absorption strap mounting assembly configuration enables optimized packaging, simplified fastener interfacing, and improves lateral and axial interlocking and positioning of the energy absorption assembly on to the jacket assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering column assembly, comprising:
a jacket assembly; and
an energy absorption assembly coupled to the jacket assembly, the energy absorption assembly including:
a first mounting member having a first mounting member portion, a first arm that extends from the first mounting member portion towards a first end of the first mounting member, and a second arm spaced apart from the first arm that extends from the first mounting member portion towards the first end of the first mounting member, and
a second mounting member having a first surface that engages an underside of the first mounting member and a second surface disposed opposite the first surface, the first surface, the first arm, the second arm, and the first mounting member portion defining an energy absorption strap mounting region.

2. The steering column assembly of claim 1, wherein the first arm defines a first notch disposed proximate the first mounting member portion.

3. The steering column assembly of claim 2, wherein the second arm defines a second notch disposed proximate the first mounting member portion.

4. The steering column assembly of claim 3, wherein the energy absorption assembly further includes an energy absorption strap having a first standoff feature received within the first notch and the energy absorption strap having a second standoff feature received within the second notch.

5. The steering column assembly of claim 4, wherein the first standoff feature engages the first surface and the second standoff feature engages the first surface.

6. The steering column assembly of claim 5, wherein an end portion of the energy absorption strap is disposed above the first surface.

7. A steering column assembly, comprising:
a first energy absorption strap; and
an energy absorption strap mounting assembly coupled to a jacket assembly, the energy absorption strap mounting assembly comprising:
an engagement surface,
at least one standoff extending from the first energy absorption strap and spaces the first energy absorption strap from the engagement surface in an assembled condition, the spacing defining a receiving area configured to receive a second energy absorption strap therein; and
a first mounting member having a first mounting member portion, a first arm, and a second arm spaced apart from the first arm.

8. The steering column assembly of claim 7, further comprising a second mounting member, wherein the engagement surface is provided with the second mounting member.

9. The steering column assembly of claim 8, wherein the first arm defines a first notch configured to receive the at least one standoff.

10. The steering column assembly of claim 8, wherein the second energy absorption strap is nested with the first energy absorption strap.

11. An energy absorption assembly provided with a steering column assembly, the energy absorption assembly including:
a first mounting member having:
a first mounting member portion,
a first arm that extends from the first mounting member portion towards an end of the first arm, and
a second arm spaced apart from the first arm that extends from the first mounting member portion towards a second arm end, the first arm, the second arm, and the first mounting member portion defining an opening, and
a second mounting member having:
a second mounting member portion that includes: a first surface and a second surface disposed opposite the first surface, the first surface engages a first arm underside, a second arm underside, and a first mounting member portion underside.

12. The energy absorption assembly of claim 11 wherein the first arm defines a first notch disposed proximate the first mounting member portion.

13. The energy absorption assembly of claim 12, wherein the second arm defines a second notch disposed proximate the first mounting member portion.

14. The energy absorption assembly of claim 13, wherein the first arm defines a third notch disposed proximate the end of the first arm.

15. The energy absorption assembly of claim 14, wherein the second arm defines a fourth notch disposed proximate the end of the second arm.

16. The energy absorption assembly of claim 11, wherein the first arm includes a first feature disposed proximate the end of the first arm, the first feature extends towards the second arm.

17. The energy absorption assembly of claim 16, wherein the second arm includes a second feature disposed proximate the end of the second arm, the second feature extends towards the first arm.

18. The energy absorption assembly of claim 17, wherein the second mounting member portion defines a first recess that extends from a second mounting member first end towards a second mounting member second end.

19. The energy absorption assembly of claim 18, wherein the first recess is disposed proximate the end of the first arm and the end of the second arm.

* * * * *